Patented Feb. 21, 1950

2,498,084

UNITED STATES PATENT OFFICE 2,498,084

INTERPOLYMERS OF FUMARIC ESTERS AND A CHLORINATED ALKENE

Jerome G. Kuderna, Jr., Passaic, N. J., and Robert H. Snyder, Chicago, Ill., assignors to United States Rubber Company, New York, N. Y., a corporation of New Jersey No Drawing. Application April 19, 1946, Serial No. 663,616

6 Claims. (Cl. 260—78.5)

Our invention comprises a method for preparing a new class of unsaturated polymeric materials of relatively low molecular weight which are soluble in a variety of organic liquids, but which are convertible to insoluble, infusible resins in the presence of heat and/or catalysts, by further polymerization or by copolymerization with reactive compounds containing an ethylenic linkage.

More particularly, our invention relates to unsaturated, polymeric materials derived from a monomeric allylic fumarate and a monomeric allylic halide. These new binary copolymers contain halogen which improves their resistance to burning and thus renders them of use in the preparation of flame-proofing compositions for coating and impregnation purposes. When the allylic halide employed contains a second halogen atom the interpolymers with the allylic fumarates are completely self-extinguishing in the well-known A. S. T. M. test.

Prior workers in this art of polymerizing allylic fumarates have encountered difficulty in controlling the polymerization of these allylic fumarates so as to obtain soluble, fusible polymers. Various devices for increasing the yield of the soluble, fusible polymer have been suggested such as carrying out polymerization at elevated temperatures, preferably at about 180° C. or higher. However, since the rate of the polymerization is enormously accelerated at these temperatures, the control of the reaction becomes difficult, particularly in a reaction vessel of industrial size, and premature insolubilization of the reaction mixture becomes increasingly difficult to avoid. Also, heretofore it has been known to obtain high yields of soluble, fusible polyallylic fumarates by polymerizing the fumarate in an inert solvent and keeping the concentration of the monomeric allylic fumarate below 40% by weight. However, the rate of polymerization in such case tends to decrease in dilute solutions, the conversion of monomer to polymer is still comparatively inefficient, and the solvent increases the material cost which necessitates additional time and labor for its removal from the reaction product, and lowers the production capacity of the reaction vessel.

We have now unexpectedly found that polymerizing an allylic fumarate in the presence of a sufficient quantity, that is, at least 10% (based on the weight of the fumarate) of a monomeric halogeno-alkene having at least 3 carbon atoms, preferably those of the formula $C_nH_{2n-x}Cl_x$ (where $n$ is an integer greater than 2 and $x$ is 1 or 2) by heating the mixture, preferably at temperatures below 120° C., and in the presence of a conventional peroxidic catalyst, gives high yields of soluble, fusible interpolymers. The reaction temperatures employed preferably range from about 25° C. to about 120° C., although higher temperatures may be used if desired. Examples of suitable catalysts among others are acetyl peroxide, benzoyl peroxide, acetyl benzoyl peroxide, succinyl peroxide and tertiary-butyl hydrogen peroxide, etc.

The course of the polymerization can be followed by observing the increase in the viscosity of the reaction mixture and when the copolymerization has proceeded to the desired extent the reaction is halted by cooling. The resulting interpolymer can be recovered from the reaction mixture by distilling out any unreacted starting materials or by extracting them with a solvent in which the polymer is insoluble such as n-hexane. The interpolymer can be further purified by dissolving it in a solvent for the polymer such as acetone and precipitating with a non-solvent such as n-hexane.

The concentration of the monomeric allylic fumarate in the reaction mixture does not have to be kept below 40%; in fact, the reaction can be carried out in the absence of any solvent other than the copolymerizable monomers themselves. Since our interpolymers are soluble in allylic halides we prefer to carry out the interpolymerizations in the presence of an excess of the allylic halide, for the resulting mobile, free-flowing solutions are easily handled in transfer, mixing, storage and other mechanical operations to which the solid interpolymers themselves may be less amenable. The allylic halide in our invention may thus serve not only as a copolymerizable monomer but also as a cheap volatile solvent which because it shows little tendency to homopolymerize under these conditions can be easily removed from the reaction mixture by distillation and recovered for use in subsequent copolymerizations.

That our new products are true interpolymers of an allylic fumarate and an allylic halide is indicated by elementary analyses and other specific tests. They contain attached to the polymer chain halomethyl groups derived from the interpolymerized allylic halide molecules which render the copolymer capable of being modified by treatment with appropriate reagents, which replace the halogen with various groups such as hydroxyl, mercapto, alkoxy, alkenoxy, acyloxy, cyano, etc. Metathetical reactions can also be carried out with corresponding polyfunctional reagents such as the sodium salts of polycarboxylic acids, glycols, etc. By such reactions our new polymers can be converted into other modified polymers having desirable properties.

The allylic fumarates which we have found to be most suitable in the practice of our invention are diallyl fumarate, dimethallyl fumarate and di-(2-chloroallyl) fumarate, while the preferred allylic halides are the 2-alkenyl halides having the type formula CHR=CR'—CH₂X where one of the substituents R and R' is selected from the class consisting of hydrogen, alkyl, halogenoalkyl, and halogen, and the other is hydrogen; X is halogen. Exemplary of these allylic halides are allyl chloride (3-chloro-propene), methallyl chloride, 2-chloroallyl chloride, 2-(chloromethyl) allyl chloride, 3-chloroallyl chloride, etc. For cases where the resin must be completely self-extinguishing, we have found the copolymers of an allylic fumarate with 2-chloroallyl chloride and with 2-chloromethyl allyl chloride to be most suitable.

Other halogenated alkenes (i. e., other than the "allylic" type) containing more than two carbon atoms, e. g., 2-chloropropene, isocrotyl chloride, etc., can also be employed in our invention, although in general they are somewhat inferior to the above mentioned allylic halides in repressing the gelation of the polymerizing reaction mixtures. However, a mixture of isomeric dichlorobutenes (B. Pt. 130–135° C. at 760 mm.; $N_D^{20}=1.4739$) obtained as a by-product in the chlorination of isobutylene, has proven to be as efficacious as many of the simple allylic halides in carrying out our invention. The principal component of this mixture is believed to be an allylic-type chloride of the formula $$CH_2=C(CH_2Cl)CH_2Cl$$

The relative proportions of the allylic fumarate and the allylic halide may be varied over a considerable range, including 10% to 500% of the halide on the weight of fumarate, depending upon the physical properties and the amount of halogen desired to be present in the polymeric product. Copolymerization of the allylic fumarate with as little as 10% of an allylic halide (based on the weight of the allylic fumarate) retards the gelation of the reaction mixture during the early stage of the polymerization and insures the production of a soluble, fusible product. The higher the amount of the allylic halide present, the higher is the proportion of the monomeric allylic fumarate which can be converted to the polymeric stage without insolubilization.

The copolymers can be cast or molded in a known manner to form rods, blocks or sheets. They can also be dissolved in an appropriate solvent and employed as lacquers or as an impregnating and waterproofing composition.

Application of heat to compositions containing our unsaturated interpolymers, particularly in the presence of catalysts, induces further polymerization and the resulting cross-linked products are quite indifferent to attack by solvents. Suitable dyes, pigments, fillers, and plasticizers can be incorporated with our interpolymers at the soluble, fusible stage prior to final cure.

Our unsaturated interpolymers can be dissolved in many organic solvents, particularly in copolymerizable compounds containing an ethylenic  linkage such as methyl acrylate, diallyl fumarate, vinyl acetate, allylacrylate, etc. The resulting solutions can be totally copolymerized to insoluble, infusible products, if need be, without leaving any solvent to be evaporated. Even at high solids content many of the solutions are still quite fluid and can be employed as coating materials by spraying, brushing, and dipping. They can also be employed in casting, laminating and impregnating operations, particularly where articles capable of being preformed and then "set" or cured in a final shape are desired. Curing temperatures of 60° C.–120° C. are suitable.

The following examples disclose our invention in more detail; all parts being by weight:

EXAMPLE 1

To illustrate our discovery that by copolymerization of an allylic fumarate with an allylic halide the gelation of the reaction mixture is repressed, a series of copolymerizations of various mixtures of an allylic fumarate and allylic halides are carried out at 60° C. in the presence of benzoyl peroxide catalyst.

Copolymerizations of "allylic" (i. e., 2-alkenyl) fumarates with 2-chloropropene, and with the dichlorobutene mixture previously described, are also included, to demonstrate that not only the allylic halides but other halogenated olefines containing more than two carbon atoms are operative in our invention. The copolymerizations are halted at the point of incipient gelation by cooling and adding a trace of hydroquinone as a polymerization inhibitor. The copolymers are then isolated by pouring the reaction mixtures into ligroin and the precipitated polymers are further purified by dissolving them in acetone and precipitating with ligroin. After drying to constant weight, the conversion of monomers to polymer is determined in each case.

The data are summarized in Table I showing the weights of the copolymerizable monomers, the peroxide catalyst and the purified products, together with the times elapsed at the point of incipient gelation, (except those marked with an asterisk (*) which did not gel). For purposes of comparison only, the allylic fumarates are also polymerized under identical conditions but in the absence of allylic halides. It is apparent that by copolymerization of the allylic fumarate with sufficient amounts of allylic halides, high yields of soluble, fusible copolymers are obtained. Comparison of I-1 with I-2 and I-34 with I-35 clearly shows the effect of even small amounts of the allylic halide in increasing the amount of conversion of the monomeric allylic fumarate to the soluble, fusible polymeric form. I-8 and I-16 illustrate the variation in the yield of soluble, fusible interpolymer which is achieved by varying the copolymerizable allylic halide.

Table I

| No. | Diallyl Fumarate | Dimethallyl Fumarate | Di-(2-chloroallyl) Fumarate | Allyl Chloride | Methallyl Chloride | 2-Chloroallyl Chloride | 3-Chloroallyl Chloride | Dichlorobutene Mixture | 2-Chloropropene | Benzoyl Peroxide | Time to gel pt., hrs. | Yield |
|---|---|---|---|---|---|---|---|---|---|---|---|---|
| 1 | 100 | | | | | | | | | 1.0 | 4.15 | 9.0 |
| 2 | 100 | | | | 12.0 | | | | | 1.5 | 3.75 | 26.0 |
| 3 | 100 | | | | 23.0 | | | | | 3.7 | 4.75 | 38.0 |
| 4 | 100 | | | | 46.0 | | | | | 7.3 | 7.00 | 47.0 |
| 5 | 100 | | | | 69.0 | | | | | 9.3 | 11.75 | 72.0 |
| 6 | 100 | | | | 92.0 | | | | | 11.2 | 18.25 | 79.0 |
| 7 | 100 | | | | 186.0 | | | | | 18.6 | 74.0 | 121.0 |
| 8 | 100 | | | 14.0 | | | | | | 1.5 | 9.0 | 33.0 |
| 9 | 100 | | | 31.0 | | | | | | 1.9 | 21.0 | 54.0 |
| 10 | 100 | | | 57.0 | | | | | | 2.4 | 32.0 | 75.0 |
| 11 | 100 | | | 88.0 | | | | | | 3.1 | 33.0 | 97.0 |

Table I—Continued

| No. | Diallyl Fumarate | Dimeth-allyl Fumarate | Di-(2-chloro-allyl) Fumarate | Allyl Chloride | Meth-allyl Chloride | 2-Chloro-allyl Chloride | 3-Chloro-allyl Chloride | Dichlor-butene Mixture | 2-Chloro-propene | Benzoyl Peroxide | Time to gel pt., hrs. | Yield |
|---|---|---|---|---|---|---|---|---|---|---|---|---|
| 12 | 100 | | | | | 105.0 | | | | 3.5 | 55.0 | 110.0 |
| 13 | 100 | | | | | 132.0 | | | | 4.1 | 72.0 | 132.0 |
| 14 | 100 | | | | | 228.0 | | | | 6.1 | *64.0 | 198.0 |
| 15 | 100 | | | | | 320.0 | | | | 8.1 | *154.0 | 290.0 |
| 16 | 100 | | | | | | 14.0 | | | 1.5 | 1.0 | 11.0 |
| 17 | 100 | | | | | | 31.0 | | | 1.9 | 1.5 | 16.0 |
| 18 | 100 | | | | | | 57.0 | | | 2.4 | 3.25 | 21.0 |
| 19 | 100 | | | | | | 105.0 | | | 3.5 | 5.0 | 36.0 |
| 20 | 100 | | | | | | 132.0 | | | 4.1 | 6.0 | 40.0 |
| 21 | 100 | | | | | | 228.0 | | | 6.1 | 10.75 | 54.0 |
| 22 | 100 | | | | 59.0 | | | | | 3.1 | 4.5 | 30.0 |
| 23 | 100 | | | | 157.0 | | | | | 6.2 | 9.0 | 68.0 |
| 24 | 100 | | | | | | | 15.9 | | 1.53 | 4.0 | 26.0 |
| 25 | 100 | | | | | | | 34.7 | | 1.89 | 5.5 | 46.0 |
| 26 | 100 | | | | | | | 64.0 | | 2.43 | 8.75 | 53.0 |
| 27 | 100 | | | | | | | 149.0 | | 4.07 | 17.75 | 86.0 |
| 28 | 100 | | | | | | | 366.0 | | 8.28 | 49.75 | 162.0 |
| 29 | 100 | | | | | | | | 10.25 | 1.54 | 1.25 | 11.0 |
| 30 | 100 | | | | | | | | 20.6 | 1.86 | 1.25 | 12.0 |
| 31 | 100 | | | | | | | | 39.7 | 2.43 | 1.25 | 18.0 |
| 32 | 100 | | | | | | | | 156.0 | 6.15 | 3.0 | 56.0 |
| 33 | 100 | | | | | | | | 224.0 | 8.27 | 6.75 | 70.0 |
| 34 | | 100 | | | | | | | | 1.10 | 11.5 | 10.0 |
| 35 | | 100 | | | 10.0 | | | | | 1.30 | 8.5 | 39.0 |
| 36 | | 100 | | | 230.0 | | | | | 7.30 | *200.0 | 93.0 |
| 37 | | | 100 | | | 10.7 | | | | 1.3 | 3.75 | 28.0 |
| 38 | | | 100 | | | 22.6 | | | | 1.4 | 15.25 | 45.0 |
| 39 | | | 100 | | | 42.0 | | | | 1.81 | 24.00 | 71.0 |
| 40 | | | 100 | | | 63.3 | | | | 2.26 | 37.75 | 96.0 |
| 41 | | | 100 | | | 97.5 | | | | 3.00 | *169.5 | 116.0 |
| 42 | | | 100 | | | 168.0 | | | | 4.54 | *147.5 | 193.0 |
| 43 | | | 100 | | | 236.0 | | | | 6.00 | *201.5 | 245.0 |

EXAMPLE 2

A mixture of 98.0 parts of diallyl fumarate, 135.8 parts of methallyl chloride and 4.84 parts of benzoyl peroxide is heated at 88° C. for 7 hours and the polymeric product is then isolated by pouring the reaction mixture into ligroin. The precipitated interpolymer is then further purified by repeatedly dissolving it in acetone and precipitating with ligroin. After drying in vacuo to constant weight 109 parts of solid polymer are obtained.

Analysis—Found: C, 58.99%; H, 6.91%; Cl, 13.47%; Iodine number (Wijs) 127.1.

The analysis corresponds to a copolymer derived from approximately 65.7% by weight of diallyl fumarate and 34.3% of methallyl chloride. This represents a conversion of approximately 73% of the monomeric diallyl fumarate to the soluble interpolymeric form.

A solution of 10.0 parts of the interpolymer in 4.5 parts of methyl acrylate has a viscosity of 95 poise at 25° C. and after mixing with 0.09 part of benzoyl peroxide the solution is heated at 60° C. for 15 hours and then 3 additional hours at 120° C. to yield a clear insoluble casting. When allyl acrylate is substituted for the methyl acrylate, a casting is obtained which possesses a Rockwell hardness of M-120.

EXAMPLE 3

Similarly, a mixture of 98 parts of diallyl fumarate and 181 parts of methallyl chloride is heated, together with 4.84 parts of benzoyl peroxide, for 32 hours at 90° C. and after isolating and purifying the reaction product as in Example 2 above, 113 parts of solid polymer are obtained.

Analysis—Found: C, 58.45%; H, 6.82%; Cl, 15.1%; Iodine number 123.3.

The analysis corresponds to a copolymer derived from approximately 38.5% by weight of methallyl chloride and 61.5% of diallyl fumarate.

Four parts of the interpolymer are dissolved in a mixture of 8 parts of xylene, 1 part of acetone and 1 part of cyclohexanone. The solution is flowed onto a glass panel and baked at 200° C. for 20 minutes. The resulting film is clear, smooth and glossy. It is not attacked by acetone, cyclohexanone, benzene or by soapy water.

EXAMPLE 4

Samples of the interpolymer prepared in Example 3 above are dissolved in various copolymerizable monomers, admixed with benzoyl peroxide and converted to clear, insoluble, infusible castings by heating at elevated temperatures. The pertinent data are summarized in Table II.

Table II

| | Inter-polymer, parts | Copolymerizable Monomer, parts | | | | | | | | Perox-ide, parts | Curing Time hours, at— | | Hardness (Rockwell) M-scale |
|---|---|---|---|---|---|---|---|---|---|---|---|---|---|
| | | Methyl Acrylate | Diallyl Fumarate | Diethyl Fumarate | Diallyl Adipate | Allyl Acrylate | n-Butyl Acrylate | Sty-rene | Vinyli-dene Chloride | | 60° C. | 100° C. | |
| a | 10 | 4.5 | | | | | | | | 0.09 | 16 | 5 | 87 |
| b | 10 | | 4.5 | | | | | | | 0.09 | 16 | 5 | 121 |
| c | 10 | | 2.25 | 2.25 | | | | | | 0.09 | 16 | 5 | 115 |
| d | 10 | | | | 4.5 | | | | | 0.225 | 16 | 5 | 80 |
| e | 10 | | 2.25 | | | | | 2.25 | | 0.09 | 16 | 5 | 76 |
| f | 10 | | | | 4.5 | | | | | 0.225 | 24 | 6 | 113 |
| g | 10 | | | | | 4.5 | | | | 0.09 | 24 | 6 | 84 |
| h | 10 | | | ¹4.5 | | | | | | 0.225 | 24 | 5 | 102 |
| i | 10 | | | | | | | | 4.5 | 0.135 | ²3 | 3 | 90 |
| j | 10 | | | | 4.5 | | | | | 0.18 | 24 | 5 | 118 |

¹ 0.225 part of dibutyl phthalate added as plasticizer.
² 48 hours pre-cure at 30° C.

EXAMPLE 5

Fifty-six parts of dimethallyl fumarate are heated with 90.5 parts of methallyl chloride and 3.03 parts of benzoyl peroxide for 31 hours at 90° C. The product is isolated and purified as in previous examples, and yields 51 parts of polymeric solid.

Analysis—Found: C, 60.68%; H, 7.40% Cl, 12.3%; Iodine number 101.0.

The analysis corresponds to a copolymer derived from approximately 68.7% by weight of dimethallyl fumarate and 31.3% of methallyl chloride.

A solution of 10 parts of the interpolymer in 4.5 parts of methyl acrylate has a viscosity of 4.5 poise at 25° C. The solution is admixed with 0.18 part of benzoyl peroxide and heated in a mold for 18 hours at 60° C. and then for 4 hours at 100° C. The resulting transparent casting is indifferent to attack by organic solvents and has a Rockwell hardness of M–82. A similar casting having a Rockwell hardness of M–102 is secured when diallyl fumarate is substituted for methyl acrylate, as the copolymerizable monomer.

EXAMPLE 6

A mixture of 98 parts of diallyl fumarate, 222 parts of 2-chloroallyl chloride and 6.05 parts of benzoyl peroxide is heated at 95° C. for 64 hours and after the usual purification, 163.4 parts of solid polymer are obtained.

Analysis—Found: C, 45.64%; H, 4.86%; Cl, 34.95%; Iodine number 50.8.

The analysis indicates a copolymer containing approximately 45.3% by weight of diallyl fumarate and 54.7% of 2-chloroallyl chloride. This corresponds to a conversion of approximately 75.0% of the monomeric diallyl fumarate to the polymeric form.

Another sample of the copolymer is prepared by heating a mixture of 9.8 parts of diallyl fumarate, 22.2 parts of 2-chloroallyl chloride and 0.605 part of benzoyl peroxide at 60° C. for 102 hours. Thirty and sixteen-hundredths parts of the crude reaction mixture are evacuated at 1 mm. and 25° C. until 3.42 parts of unreacted starting materials have been removed. Ten parts of monomeric styrene are then added and the evacuation is continued until the total weight of the residue is 79.7 parts. This solution of the diallyl fumarate-2-chloroallyl chloride copolymer in monomeric styrene is admixed with 0.6 part of benzoyl peroxide and heated in a mold for 16 hours at 70° C. The clear casting has a Rockwell hardness of L–112 and M–102, is unattacked by acetone, and will not support combustion.

EXAMPLE 7

Casting compositions are prepared by dissolving samples of the copolymer of Example 6 in various copolymerizable monomers and after determining the viscosities of these solutions, they are admixed with benzoyl peroxide and polymerized by heating at elevated temperatures. The resulting castings are clear, insoluble in organic solvents and substantially infusible. They will not support combustion even after 30 seconds exposure to a flame. The data are summarized in Table III.

Table III

| | Interpolymer, parts | Copolymerizable Monomer, parts | | | | Viscosity, poise | Peroxide, parts | Curing Time, hours | | Hardness |
|---|---|---|---|---|---|---|---|---|---|---|
| | | Methyl Acrylate | Allyl Acrylate | B-chlorethyl Acrylate | Diallyl Fumarate | | | 60° C. | 100° C. | |
| a | 10 | | | 4.5 | | 3.0 | 0.135 | 45 | 7 | M-51 |
| b | 10 | | | | 4.5 | 8.0 | 0.135 | 48 | | M-103 |
| c | 10 | | 4.5 | | | 0.5 | 0.135 | 45 | | M-99 |
| d | 16 | | 4.0 | | | 4.0 | 0.12 | 41 | 3 | M-72 |
| e | 16 | 4.0 | | | | 14.0 | 0.12 | 41 | | L-77 |

EXAMPLE 8

One hundred parts of diallyl fumarate are heated together with 157 parts of allyl chloride and 6.2 parts of benzoyl peroxide for 9 hours at 60° C. to yield 63 parts of solid purified polymer.

Analysis—Found: C, 57.85%; H, 6.35%; Cl, 11.1%.

The analysis indicates a copolymer derived from approximately 76% by weight of diallyl fumarate and 24% of allyl chloride.

EXAMPLE 9

A mixture of 19.6 parts of diallyl fumarate, 112.5 parts of a mixture of isomeric dichlorobutenes and 2.42 parts of benzoyl peroxide is heated at 60° C. for 145 hours, and after purification as in the preceding examples, 59.2 parts of polymeric solid are secured.

Analysis—Found: C, 47.16%; H, 5.24%; Cl, 37.56%; Iodine number 41.7.

The analysis corresponds to a copolymer containing approximately 34.0% by weight of diallyl fumarate and 66% of one or both of the isomeric dichlorobutenes.

Ten parts of the copolymer are dissolved in 4.5 parts of monomeric diallyl fumarate together with 0.09 part of benzoyl peroxide and the mixture is heated in a mold for 24 hours at 60° C., then for 5.5 hours at 85° C., and finally for an additional 15 hours at 60° C. to yield a clear casting which is unattacked by acetone and has a Rockwell hardness of L–95.

EXAMPLE 10

A mixture of 10.6 parts of di-(2-chloroallyl) fumarate, 17.8 parts of 2-chloroallyl chloride and 0.48 part of benzoyl peroxide is heated for 51 hours at 60° C., and after the usual purification, 15.5 parts of colorless polymeric solid are obtained.

Analysis—Found: C, 39.88%; H, 3.79%; Cl, 42.85%.

The analysis corresponds to a copolymer containing approximately 57% by weight of di-(2-chloroallyl) fumarate and 43% of 2-chloroallyl chloride.

Three and five-tenths parts of the copolymer are dissolved in 1.5 parts of monomeric styrene together with 0.045 part of benzoyl peroxide and the mixture is heated in a mold for 46 hours at 60° C. yielding a clear solvent-resistant casting which does not support combustion.

A casting is made in an analogous manner employing monomeric diallyl fumarate in place of styrene. The product is flame-resistant and insoluble in acetone.

The soluble 2-chloroallyl chloride-diallyl fumarate is especially useful; it has a low, indefinite softening point, i. e., it sinters to a glossy mass even at ordinary room temperatures; at 70° C. it is like very heavy molasses, and at 120° C. it is like glycerine; it is soluble in acetone, chloroform, vinyl acetate, methyl acrylate, allyl alcohol, diallyl fumarate, styrene, etc.; it has considerable unsaturation, thereby enabling it to react readily with polymerizable unsaturated monomers.

While we have shown and described various embodiments of the invention, it is to be understood that the invention is susceptible to those modifications which appear within the spirit of the invention and the scope of the appended claims.

Having thus described our invention, what we claim and desire to protect by Letters Patent is:

1. A soluble unsaturated binary copolymer of a di-2-alkenyl fumarate selected from the class consisting of diallyl fumarate, dimethallyl fumarate, and di(2-chloroallyl) fumarate and a chlorinated-alkene having from three to four carbon atoms prepared from a mix in which the said alkene ranges from 10–500% by weight based on the weight of the fumarate.

2. A soluble unsaturated binary copolymer of a di-2-alkenyl fumarate selected from the class consisting of diallyl fumarate, dimethallyl fumarate, and di(2-chloroallyl) fumarate and a chlorinated-alkene having the formula $C_nH_{2n-x}Cl_x$ where $n$ is an integer of 3 to 4; $x$ is an integer of from 1 to 2 prepared from a mix in which the said alkene ranges from 10–500% by weight based on the weight of the fumarate.

3. A soluble unsaturated binary copolymer of a di-2-alkenyl fumarate selected from the class consisting of diallyl fumarate, dimethallyl fumarate, and di(2-chloroallyl) fumarate and a chlorinated-alkene having the formula $$C_nH_{2n-x}Cl_x$$

where $n$ is an integer of 3 to 4; $x$ is 2 prepared from a mix in which the said alkene ranges from 10–500% by weight based on the weight of the fumarate.

4. A soluble unsaturated binary copolymer of a di-2-alkenyl fumarate selected from the class consisting of diallyl fumarate, dimethallyl fumarate and di(2-chloroallyl) fumarate and 2-chloroallyl chloride prepared from a mix in which the said chloride ranges from 10–500% by weight based on the weight of the fumarate.

5. An organic solvent solution of a soluble unsaturated copolymer of a di-2-alkenyl fumarate selected from the class consisting of diallyl fumarate, dimethallyl fumarate, and di(2-chloroallyl) fumarate and a chlorinated-alkene having from three to four carbon atoms said copolymer being prepared from a mix in which the said alkene ranges from 10–500% by weight based on the weight of the fumarate, in which the organic solvent contains an ethylenic linkage and is substantially completely polymerizable with the said soluble binary copolymer whereby to produce a solution which can be totally copolymerized to an insoluble infusible product.

6. A method which comprises polymerizing with heat and in the presence of a peroxidic polymerization catalyst a di-2-alkenyl fumarate selected from the class consisting of diallyl fumarate, dimethallyl fumarate, and di(2-chloroallyl) fumarate with a chlorinated-alkene having at least three carbon atoms, the polymerization being carried out at a temperature in the range from about 25° C. to about 120° C. and halting the polymerization before the gel point, to form a soluble fusible unsaturated binary copolymer of said monomers the proportion of the said alkene ranging from 10–500% by weight based on the weight of the fumarate.

JEROME G. KUDERNA, Jr.
ROBERT H. SNYDER.

REFERENCES CITED

The following references are of record in the file of this patent:

UNITED STATES PATENTS

| Number | Name | Date |
| --- | --- | --- |
| 2,392,756 | Mighton | Jan. 8, 1946 |
| 2,419,221 | Kenyon et al. | Apr. 22, 1947 |
| 2,431,374 | D'Alelio | Nov. 25, 1947 |
| 2,433,616 | Marple et al. | Dec. 30, 1947 |